(12) United States Patent
Sheehan et al.

(10) Patent No.: US 12,541,399 B1
(45) Date of Patent: Feb. 3, 2026

(54) RULES-BASED RESOURCE DISTRIBUTION

(71) Applicant: THE HUNTINGTON NATIONAL BANK, Columbus, OH (US)

(72) Inventors: Tammy Sheehan, Columbus, OH (US); Dontae Noel, Columbus, OH (US); Ram Rao, Columbus, OH (US)

(73) Assignee: The Huntington National Bank, Columbus, OH (US)

( * ) Notice: Subject to any disclaimer, the term of this patent is extended or adjusted under 35 U.S.C. 154(b) by 0 days.

(21) Appl. No.: 18/983,455

(22) Filed: Dec. 17, 2024

(51) Int. Cl.
*G06F 9/50* (2006.01)

(52) U.S. Cl.
CPC .................. *G06F 9/5027* (2013.01)

(58) Field of Classification Search
None
See application file for complete search history.

(56) References Cited

U.S. PATENT DOCUMENTS

| | | | | |
|---|---|---|---|---|
| 7,523,068 B2* | 4/2009 | Britney | ............... | G06Q 20/10 705/40 |
| 8,099,361 B1* | 1/2012 | Gupta | ............... | G06Q 40/02 705/40 |
| 8,510,187 B1* | 8/2013 | Dinamani | ............... | G06Q 40/10 705/31 |
| 8,554,675 B2* | 10/2013 | Gupta | ............... | G06Q 20/10 705/40 |
| 8,788,324 B1* | 7/2014 | Shetty | ............... | G06Q 30/0601 705/14.1 |
| 10,296,899 B2* | 5/2019 | Lee | ............... | G06Q 20/24 |
| 10,853,791 B1* | 12/2020 | Ellis | ............... | G06Q 20/3676 |
| 11,276,065 B2* | 3/2022 | Shahin | ............... | G06Q 20/4016 |
| 12,373,833 B2* | 7/2025 | Kaidi | ............... | G06F 21/32 |
| 2002/0111916 A1* | 8/2002 | Coronna | ............... | G06Q 20/382 705/40 |
| 2005/0038739 A1* | 2/2005 | Doran | ............... | G06Q 20/04 705/40 |
| 2007/0124204 A1* | 5/2007 | de Boer | ............... | G06Q 30/0209 705/14.27 |
| 2012/0130789 A1* | 5/2012 | Postrel | ............... | G06Q 30/0601 705/14.23 |
| 2012/0239531 A1* | 9/2012 | McCann | ............... | G06Q 20/385 705/26.41 |

(Continued)

*Primary Examiner* — Hiren P Patel
(74) *Attorney, Agent, or Firm* — Kilpatrick Townsend & Stockton LLP

(57) ABSTRACT

A system for preselecting a preferred mode of distribution for different resource types is disclosed. For each different type of resource distributable by a resource distribution computing system, a plurality of possible different modes of distribution may be represented on a unique user interface of a user computing device by corresponding selectable interface objects. Preferred modes of primary distribution preselected by a user can be stored as a set of user resource distribution rules that will govern future resource distributions from the resource distribution computing system to the user. An alternative mode of distribution may also be preselected for each resource type and may contribute to the user resource distribution rules. Upon subsequent receipt of a request to distribute a resource to the user, the resource distribution computing system can be configured to initiate a distribution based on at least the user resource distribution rules and the resource type.

20 Claims, 8 Drawing Sheets

(56) References Cited

U.S. PATENT DOCUMENTS

| | | | | | |
|---|---|---|---|---|---|
| 2012/0239556 | A1* | 9/2012 | Magruder | ............ | G06Q 30/06 705/39 |
| 2014/0101033 | A1* | 4/2014 | Lyles | ................ | G06Q 20/24 705/39 |
| 2014/0122328 | A1* | 5/2014 | Grigg | ................ | G06Q 20/384 705/40 |
| 2014/0214651 | A1* | 7/2014 | Prasadh | ............. | G06Q 20/12 705/39 |
| 2014/0244491 | A1* | 8/2014 | Eberle | ............... | G06Q 20/102 705/40 |
| 2016/0019530 | A1* | 1/2016 | Wang | ................. | H04N 23/57 705/39 |
| 2017/0352035 | A1* | 12/2017 | Geraud | ............ | G06Q 20/3276 |
| 2018/0018672 | A1* | 1/2018 | Shauh | ............... | G06Q 20/322 |
| 2018/0174138 | A1* | 6/2018 | Subbarayan | ......... | G06Q 20/385 |
| 2019/0057373 | A1* | 2/2019 | Van Veelen | ........... | G06Q 20/00 |
| 2019/0139074 | A1* | 5/2019 | Tan | ..................... | G06Q 20/326 |
| 2019/0318424 | A1* | 10/2019 | McWilliams | ......... | G06Q 20/10 |
| 2020/0034870 | A1* | 1/2020 | Dao | ..................... | G06Q 20/401 |
| 2020/0394625 | A1* | 12/2020 | Piparsaniya | .......... | G06Q 20/36 |
| 2021/0042713 | A1* | 2/2021 | Bag | ..................... | G06Q 30/04 |
| 2021/0182855 | A1* | 6/2021 | Nair | .................... | G06Q 20/407 |
| 2021/0326844 | A1* | 10/2021 | Zhou | .................... | G06Q 20/06 |
| 2021/0398100 | A1* | 12/2021 | Gabriele | ............. | G06Q 20/227 |
| 2022/0084024 | A1* | 3/2022 | Mossoba | ............. | G06Q 20/389 |
| 2023/0110226 | A1* | 4/2023 | Tomkins | ........... | G06Q 20/3829 705/17 |
| 2024/0249268 | A1* | 7/2024 | Matsumoto | ......... | G06Q 20/047 |

* cited by examiner

RULES-BASED RESOURCE DISTRIBUTION

TECHNICAL FIELD

The present disclosure relates generally to distributed computing infrastructure, and more particularly, although not exclusively, to improving computing efficiency by utilizing preselected preferred modes of distributing resources to a user.

BACKGROUND

Resources may be distributed between parties for various reasons, such as for example, to procure items, or as an exchange of one resource for another. Resource distributions from a transferor to a recipient typically occur through an intermediary distributor. It is commonly required, particularly when a given recipient does not regularly receive resource distributions from the transferor, that the intermediary distributor must contact the recipient at each request to transfer a resource to the recipient and for the resource transfer to be delayed until the recipient subsequently provides the distributor with a desired mode of distribution by which to receive the resource. This reduces process efficiency and can consume significant computing and human resources, especially given that an intermediary distributor may process a large volume of resource distribution requests.

SUMMARY

According to one example, a system may include a processor and a memory communicatively coupled to the processor, the memory including instructions that are executable by the processor to cause the processor to perform operations. The operations may include displaying, via a successive series of user interfaces of a user computing device, a plurality of modes of distribution by which various indicated resource types are distributable to a user by a resource distribution computing system, each resource type associated with a unique user interface. The operations may also include receiving, via a selection at each user interface of the series of user interfaces, preferred primary modes of distribution for the resource types, each preferred primary mode of distribution of the preferred primary modes of distribution corresponding to a mode of distribution of the plurality of modes of distribution. The operations may additionally include receiving, from the user computing device, the preferred primary modes of distribution selected at the series of user interfaces, and storing the preferred primary modes of distribution as a set of user resource distribution rules governing subsequent resource distributions to the user. The operations may further include receiving a request from a third party to distribute a resource to the user, the request indicating a type and a value of the resource. The operations may also include retrieving the set of user resource distribution rules, and configuring the resource distribution computing system to initiate a distribution of the resource to the user based on at least the resource type indicated in the request and according to the set of user resource distribution rules.

According to another example, a computer-implemented method may include displaying, via a successive series of user interfaces of a user computing device, a plurality of modes of distribution by which various indicated resource types are distributable to a user by a resource distribution computing system, each resource type associated with a unique user interface. The computer-implemented method may also include receiving, from the user computing device, preferred primary modes of distribution for the resource types, each preferred primary mode of distribution of the preferred primary modes of distribution corresponding to a mode of distribution of the plurality of modes of distribution. The computer-implemented method may additionally include storing the preferred primary modes of distribution as a set of user resource distribution rules governing subsequent resource distributions to the user. The computer-implemented method may further include receiving a request from a third party to distribute a resource to the user, the request indicating a type and a value of the resource. The computer-implemented method may also include retrieving the set of user resource distribution rules, and configuring the resource distribution computing system to initiate a distribution of the resource to the user based on at least the resource type indicated in the request and according to the set of user resource distribution rules.

According to a further example, a non-transitory computer readable medium may include instructions that are executable by a processor for causing the processor to perform operations. The operations may include displaying, via a successive series of user interfaces of a user computing device, a plurality of modes of distribution by which various indicated resource types are distributable to a user by a resource distribution computing system, each resource type associated with a unique user interface. The operations may also include receiving, via a selection at each user interface of the series of user interfaces, preferred primary modes of distribution for the resource types, each preferred primary mode of distribution of the preferred primary modes of distribution corresponding to a mode of distribution of the plurality of modes of distribution. The operations may additionally include receiving, from the user computing device, the preferred primary modes of distribution selected at the series of user interfaces, and storing the preferred primary modes of distribution as a set of user resource distribution rules governing subsequent resource distributions to the user. The operations may further include receiving a request from a third party to distribute a resource to the user, the request indicating a type and a value of the resource. The operations may also include retrieving the set of user resource distribution rules, and configuring the resource distribution computing system to initiate a distribution of the resource to the user based on at least the resource type indicated in the request and according to the set of user resource distribution rules.

DETAILED DESCRIPTION

Figure 1:
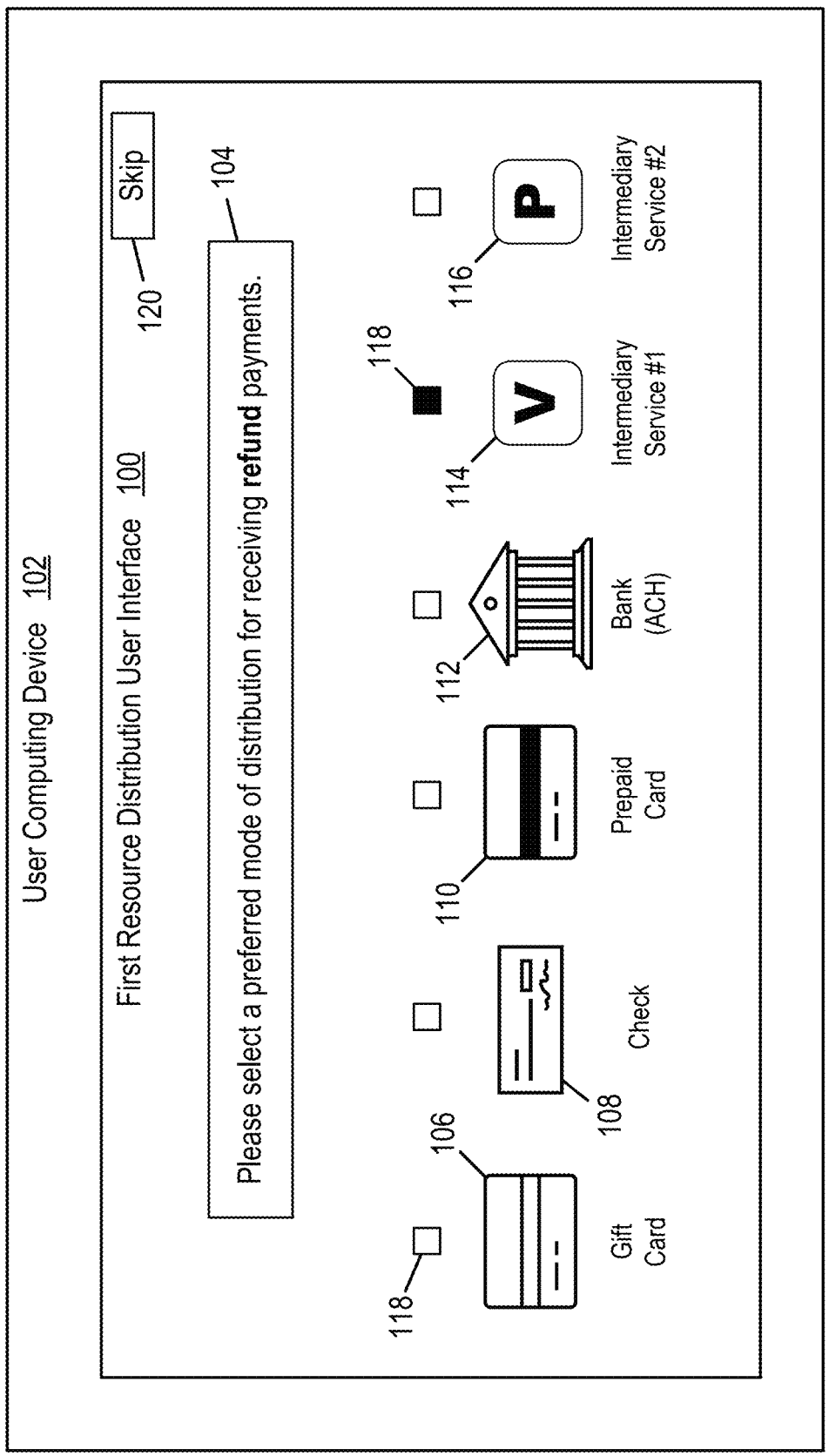
FIG. 1 is a block diagram of a customizable first user interface via which a user can select a preferred primary mode of distribution of a first type of resource according to one example.

Certain aspects and features of the present disclosure relate to a system for facilitating resource distributions to recipients using modes of distribution preselected by the recipients. The system may also be operative to effectuate distribution of a resource to a recipient via a secondary (alternative) mode of distribution in a case where the resource cannot be distributed using a preselected preferred primary mode of distribution. A type of a resource associated with a system and method according to examples of the disclosure can vary. For example, the resource may be a computing resource, including a processing resource (e.g., physical or virtual servers, applications) or a memory resource (e.g., disk storage) such as may be associated with a cloud computing environment. In another example, a resource may be a monetary resource such as a negotiable instrument, a dividend, or another type of transaction resource.

A user computing device can be initially connected to a remote resource distribution computing system (e.g., a directory) through which the resource is to be distributed. In some examples, the user computing device can be, for example, a personal computer, a laptop computer, a tablet, a smart phone, etc. In one example, the user computing device may be communicatively coupled to the remote resource distribution computing system through the Internet. In such an example, communications between the user computing device and the remote resource distribution computing system can be conducted using a web browser or an application installed on the user computing device, and may employ various cryptographic communication protocols. In one particular example, the remote resource distribution computing system may be a financial services computing system and the resource may be a monetary sum of a given value. For example, the resource may be a rebate, refund, or reward payable by a business to a customer.

In the example methods of distributing resources to a recipient described herein, it is assumed that the recipient is registered with the remote resource distribution computing system and has preselected one or more modes of resource distribution. For example, the recipient may be a client of the intermediary distributor and a user of the remote resource distribution computing system. When the remote resource distribution computing system is a computing system of a financial institution, the recipient may be a customer of the financial institution. When a user initially registers the user computing device with the remote resource distribution computing system—which can include logging into the remote resource distribution computing system via an application on the user computing device or by using a web browser—the system may automatically direct the user to a resource distribution user interface provided through the web browser or by the application. On the resource distribution user interface, the user can select preferred modes of distribution for future distribution of different types of resources to the user as a resource recipient. Alternatively, the user may, after initially registering the user computing device with the remote resource distribution computing system, navigate to the resource distribution user interface and subsequently select the preferred modes of distribution. Each user interface may allow the user to select secondary (alternative) modes of distribution for each of the different types of resources.

In some examples, a plurality of available modes of distribution for a given resource type may be presented on the resource distribution user interface(s) as selectable interface objects. Each of the plurality of interface objects may represent a different mode of distribution by which a given resource can be distributed to the user. The modes of distribution to be presented on the resource distribution user interface(s) by the representative interface objects may be determined in various ways. In one example, the system may always present the same selectable modes of distribution, regardless of the type of the resource. In another example, the system may determine the modes of distribution to be presented based on the type and/or the size of the resource.

The system can detect a selection, via the user computing device, of the interface objects of the plurality of interface objects, where the selected interface object represents the preferred primary (or preferred alternative) mode of distribution by which the user desires to receive a distribution of a given resource type. The interface objects may be selected using various selection techniques.

Once a preferred primary mode of distribution is selected for a given resource type, the system may present another screen or page, an overlay, etc., on the user interface of the user computing device. The additional screen or page may facilitate indication by the user of the alternative mode of distribution. In some examples, the presented alternative modes of distribution may be the same modes of distribution presented relative to selection of a preferred primary mode of distribution, minus the already selected preferred primary mode of distribution. In other examples, the presented alternative modes of distribution may be a subset of the modes of distribution presented relative to selection of a preferred primary mode of distribution. For example, when the resource distribution computing system is a financial resource distribution computing system, the alternative modes of distribution may be used in cases where the value of the resource to be distributed exceeds a maximum value allowable by the preferred primary mode of distribution selected by the resource recipient. As such, the presented alternative modes of distribution may be selected for permitting higher value resource distributions, or resource distributions of different values which may be distributable via different modes of distribution. In some examples, an alternative mode of distribution may be selected based on a typical time/speed associated with distributing a resource via the alternative mode of distribution, and may be utilized to distribute a resource to the user when distributing the resource by the alternative mode of distribution would be faster than distributing the resource by the selected primary mode of distribution.

The resource distribution computing system may present a user with additional user interfaces by which the user can preselect preferred primary and alternative modes of distribution for additional types of resources. For example, after presenting a user with the above-described first user interface associated with a first resource type, the resource distribution computing system may present a user with a second resource distribution user interface via which the user can respectively select preferred primary and alternative modes of distribution for a second resource type. The same process may be repeated for any number of possible resource types. In some examples, the user may be presented, prior to the preselection process, with a list of possible resource types for which the user is interested in preselecting modes of distribution. In this manner, the user can select the resource types of interest and the upstream mode of distribution preselection process can be limited to the resource types selected by the user. Alternatively, or in addition thereto, the user may be provided with a mechanism on the resource distribution user interface by which the user can skip the mode of distribution preselection process for the given resource type.

In some examples, the selection of the modes of distribution to be presented on the user computing device may be determined by a trained machine learning model. The trained machine learning model may be generated by training a machine learning model on training data comprising historical selection data associated with a plurality of historical resource mode of distribution selections executed by past users for each of a plurality of different resource types. The training data may also include value data for the resources represented in the historical selection data.

When provided with input data including an identification of the modes of distribution available to the remote resource distribution computing system in conjunction with one or more of resource type information, resource value information, or a combination thereof, the trained machine-learning model can generate an output that indicates a prediction or a recommendation of a plurality of resource modes of distribution most likely to be preferred by the user. Some or all the predicted plurality of resource modes of distribution can then be selected for presentation on the resource distribution user interface.

Once a given user has selected modes of distribution for one or more types of resources, the resource distribution computing system can store the selected modes of distribution information as a set of resource distribution rules that govern future resource distributions to the user as a resource recipient. When the resource distribution computing system thereafter receives a third party request to distribute a resource to a recipient, the resource distribution computing system can recognize that the recipient is the user and can automatically initiate or recommend a distribution of the resource to the user based on the stored resource distribution rules and the resource type. This can save both computing and human resources, as distribution of the resource can occur without a need to first contact the user or for the user to subsequently indicate how the user prefers to receive the resource distribution.

In some examples, the resource distribution computing system can provide a recipient with an alert or notification when a resource type for which the user has not previously selected a primary or alternative mode of distribution. The user may concurrently be asked or permitted to select a primary and alternative mode of distribution for the given resource type. In another example, the resource distribution computing system can provide a user with an alert or notification when a new mode of distribution is available for one or more resource types. The recipient may then be asked or permitted to select the new mode of distribution as the primary or alternative mode of distribution for one or more resource types. In some examples, the new mode of distribution may replace a previously selected mode of distribution for a given resource. In another example, the resource distribution computing system can provide a user with an alert or notification when a distribution has been initiated or completed, or if an attempted distribution using a primary or alternative mode of distribution preselected by the user has failed for any reason.

These illustrative examples are provided to introduce the reader to the general subject matter discussed herein, and are not intended to limit the scope of the disclosed concepts. In the following description, various additional features and examples are described with reference to the drawings in which like numerals indicate like elements. Various implementations may be practiced without these specific details, and features can be combined together. The figures and description are not intended to be restrictive.

FIG. 1 is a block diagram depicting one example of an initial page or screen of a first resource distribution user interface 100 displayed on a user computing device 102. The user computing device 102 is communicatively coupled to a remote resource distribution computing system ("resource distribution computing system") through which a resource is to be distributed to the user. The first resource distribution user interface 100 may, as previously described, be displayed upon registration of the user computing device with the resource distribution computing system or with the owner or the operator of the resource distribution computing system, or upon subsequent deliberate initiation of the resource distribution mode preselection process by the user. In some examples, the first resource distribution user interface 100 may be displayed upon selection of a link sent to the user computing device 102 by the resource distribution computing system, or otherwise.

As shown, the first resource distribution user interface 100 may display a notification 104 to the user. The appearance and content of the notification 104 may vary. The notification 104, or another notification, may include a mechanism (e.g., checkbox, etc.) by which the user can indicate consent to storage of selected mode of resource distribution preferences. In this particular example, the notification 104 requests that the user preselect a preferred (primary) mode of distribution by which the user may automatically receive future distributions of resources in the form of refund payments (e.g., refunds, gifts, bonus, rewards, etc.). Refund payments may be, in some examples, the return of a deposit at the end of an apartment or a vehicle lease, the return of a deposit required to establish utility service, or a refund of a payment for defective merchandise. The distribution of numerous other types of refund payments is also possible using systems according to the present disclosure. Likewise, the first resource distribution user interface 100 can allow a user to select a primary mode of distribution for other types of resources such as, for example, gifts, bonuses, or rewards.

A plurality of selectable interface objects 106-116 are also presented on the first resource distribution user interface 100. The interface objects 106-116 represent various modes of distribution that are provided by the resource distribution computing system and are selectable for receiving a resource distribution in the form of a refund payment. In this example, the modes of distribution include a gift (stored value) card 106, a paper check 108, a prepaid (e.g., physical or virtual) card 110, a bank (ACH) transfer 112 to a user account, a distribution via an intermediary service such as a Venmo® payment 114, and a distribution via another intermediary service such as a PayPal® payment 116. Other numbers or types of digital or physical modes of distribution may be presented on the first resource distribution user interface 100 in other examples.

One or more of the interface objects 106-116 may be selected by any of various techniques. For example, as shown in FIG. 1, a checkbox 118 may be associated with each of the interface objects 106-116 and can be selected via the user computing device to indicate that the mode of distribution represented by the associated interface object is the mode of distribution preferred by the user for the indicated (refund payment) resource type. In other examples, a presented mode of distribution may be selected by selecting the corresponding interface object 106-116 itself.

As shown an option to skip the process of preselecting a preferred (primary) mode of distribution for the refund payment resource type is also presented on the first resource distribution user interface 100 as an additional selectable interface object 120. When the skip interface object 120 is selected by the user, the modes of distribution preselection process can either move forward to a step of preselecting a mode of distribution for another resource type, or can terminate if there is no other resource type for which to preselect a mode of distribution.

Selecting a checkbox 118 associated with an interface object 106-116 or selecting an interface object itself may be accomplished, for example, using a keyboard, a mouse, or another input device that is a part of or is communicatively coupled to the user computing device 102. When the user computing device 102 includes a touchscreen, selecting an interface object 106-116 may also be accomplished by touching a checkbox 118 or an interface object 106-116 with a finger of the user. In some examples, interface object 106-116 selection may be accomplished by dragging an interface object 106-116 to a designated location on the first resource distribution user interface 100. The use of other interface object selection techniques, such as voice or gesture selection, is possible in other examples. In some examples, the system may be a virtual reality or augmented reality system, and viewing of and interaction with at least the first resource distribution user interface 100 and additional resource distribution user interfaces may occur in a virtual reality or augmented reality environment. In such a case, the selecting of an interface object 106-116 may be accomplished by hand gestures such as finger pinching, or finger dragging, by tracking eye movement, or via a voice command.

In the example of FIG. 1, the darkened checkbox 118 indicates that the user has selected the Venmo payment 124 mode of distribution as the preferred primary mode of distribution for receiving refund payments from third party payors. As a result, future refund payment requests received by the resource distribution computing system and directed to the user may be automatically distributed to the user via a Venmo payment.

Figure 2:
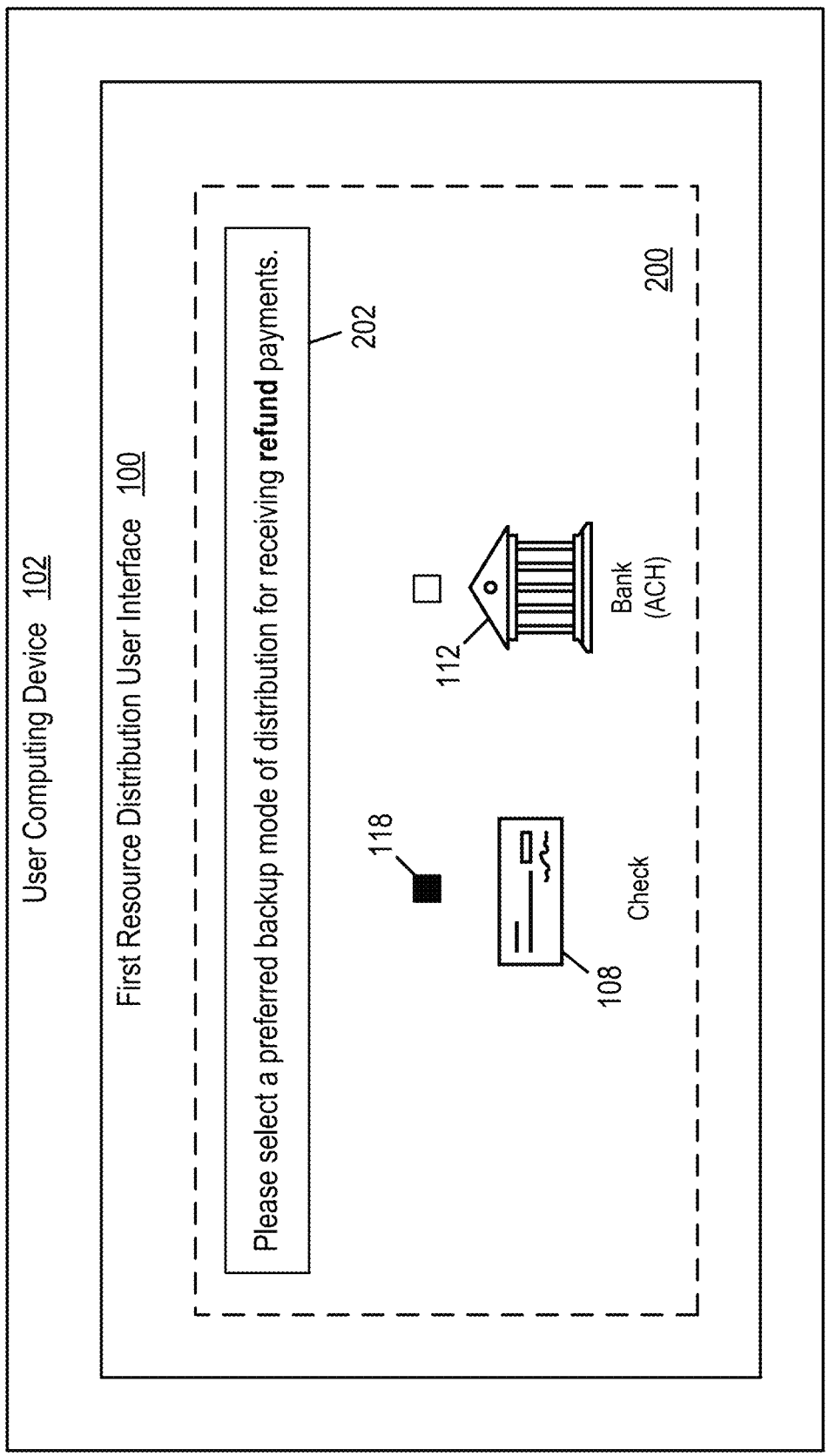
FIG. 2 is a block diagram of another screen of the first user interface via which a user can select a secondary mode of distribution of the first type of resource according to one example.

FIG. 2 is a block diagram depicting one example of an additional (second) page 200 of the first resource distribution user interface 100. The second page 200 of the first resource distribution user interface 100 may be displayed, for example, after selection of a preferred primary mode of distribution at the first resource distribution user interface 100. In some examples, the second page 200 of the first resource distribution user interface 100 may be an overlay on the first resource distribution user interface 100. The second page 200 of the first resource distribution user interface 100 may be displayed only after selection of one of the presented primary modes of distribution represented by the plurality of interface objects 106-116 on the first resource distribution user interface 100. The second page 200 of the first resource distribution user interface 100 may display a notification 202. The appearance and content of the notification 202 may vary. In this particular example, the notification 202 requests that the user preselect an alternative mode of distribution by which the user will automatically receive future distributions of resources if distribution is for some reason not possible using the already selected preferred primary mode of distribution.

The second page 200 of the first resource distribution user interface 100 of FIG. 2 can present the user with a subset of the plurality of interface objects 106-116 that were not selected as the preferred primary mode of distribution on the initial page or screen of the first resource distribution user interface 100. The subset of the plurality of interface objects 106-116 presented on the second page 200 of the first resource distribution user interface 100 is provided to allow the user to select the alternative mode of distribution if distribution of the refund payment by the preferred primary (Venmo) mode of distribution is not possible. For example, a dollar value transfer limit imposed by the preselected Venmo mode of distribution may prevent a requested refund payment from being distributed to the user via Venmo. Allowing the user to select a alternative mode of distribution that can allow for resource distributions of higher value can obviate this problem. It may also be possible that the preferred primary mode of distribution (e.g., Venmo) is not usable to transfer the refund payment to the user for technical or other reasons, and a preselected alternative mode of distribution can also be used to overcome this problem. Likewise, selecting an alternative mode(s) of distribution may also facilitate a user election to receive a resource via more than one mode of distribution (i.e., to split distribution of the resource across multiple modes of distribution). In such a case, the value of the resource may be divided equally among the multiple modes of distribution or the user may be permitted to dictate an allocation of some portion of the resource value to each of the multiple modes of distribution.

In the example of FIG. 2, the paper check 108 mode of distribution and the bank (ACH) transfer 112 mode of distribution that were not selected by the user as the preferred primary mode of distribution are presented to the user as selectable alternative modes of distribution. Other alternative modes of distribution and other numbers or combinations of alternative modes of distribution may be presented to the user in other examples. In this example, the darkened checkbox 118 indicates that the user has selected the paper check 108 mode of distribution as the alternative mode of distribution for future refund payments.

In some examples, once an alternative mode of distribution has been selected by the user, the mode of distribution preselection process may repeat for a different type of resource. Alternatively, the mode of distribution preselection process may terminate if the user has already completed the mode of distribution preselection process for all resource types distributed by the resource distribution computing system or has completed the mode of distribution preselection process for all resource types specifically selected by the user. In this example, selecting the paper check 108 mode of distribution as the alternative mode of distribution for receiving refund payments takes the user to a subsequent set of user interfaces whereby the user can repeat the above-described mode of distribution preselection process for rebate payments. Rebate payments may be, in some examples, a rebate of some dollar amount from a manufacturer or seller resulting from the purchase of a product by the user. A rebate may also be a return of some dollar amount to the user as a result of the user utilizing the services of the rebating entity. The distribution of other types of rebate payments is also possible using systems according to the present disclosure.

Figure 3:
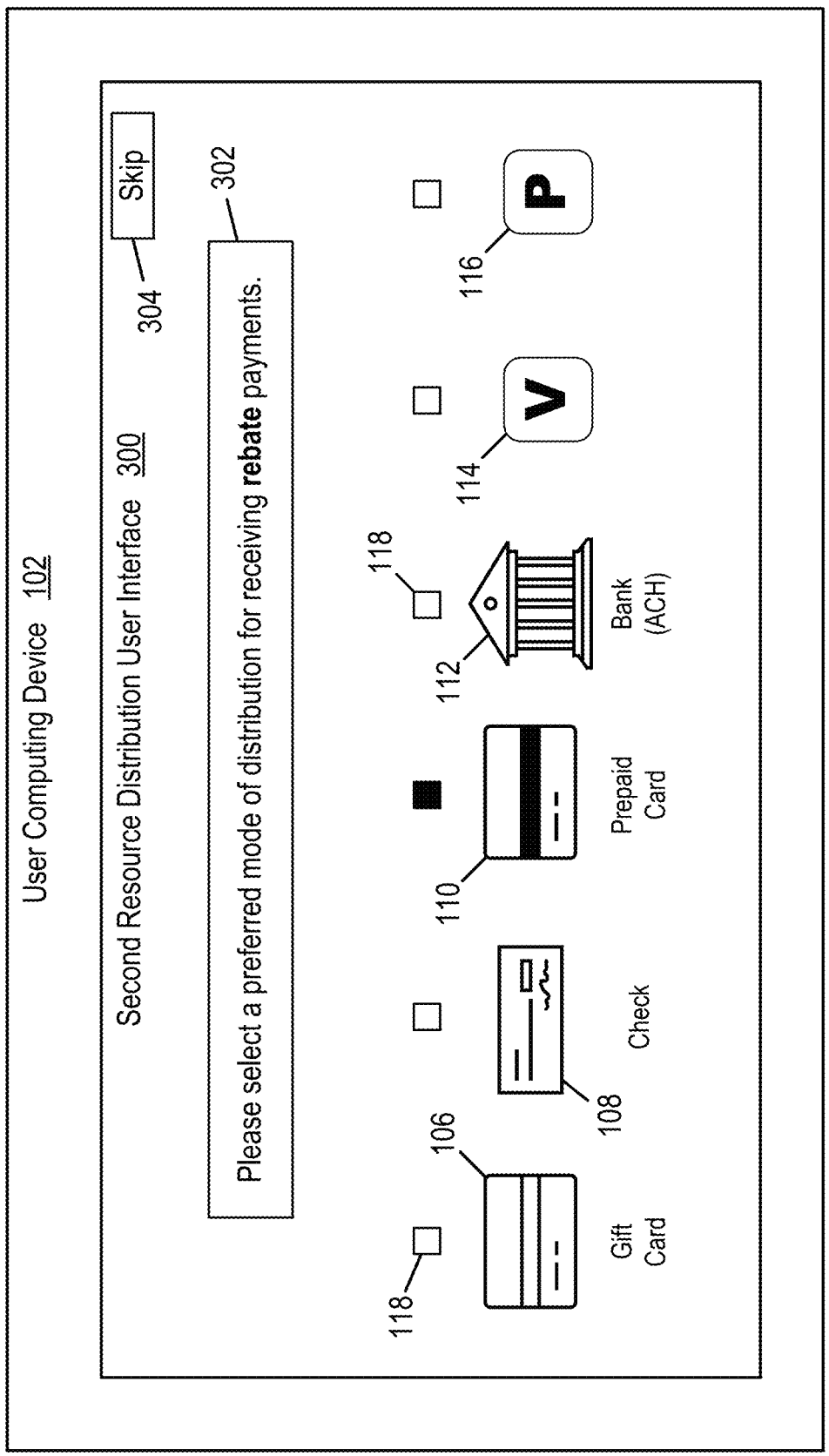
FIG. 3 is a block diagram of a customizable second user interface via which a user can select a preferred primary mode of distribution of a second type of resource according to one example.

FIG. 3 is a block diagram depicting one example of an initial page or screen of a second resource distribution user interface 300 displayed on the user computing device 102. As with the first resource distribution user interface 100, the second resource distribution user interface 300 may display a notification 302 to the user. The notification 302, or another notification, may include a mechanism (e.g., checkbox, etc.) by which the user can indicate consent to storage of selected mode of resource distribution preferences. In this example, the notification 302 requests that the user preselect a preferred mode of distribution by which the user may automatically receive future rebate payments. The same plurality of selectable interface objects 106-116 that were presented on the initial page or screen of the first resource distribution user interface 100 of FIG. 1 are also presented on the second resource distribution user interface 300 for purposes of illustration. It should be realized, however, that in other examples, the interface objects presented and the modes of distribution represented on the second resource distribution user interface 300 may be partly or entirely different from the interface objects 106-116 and the modes of distribution of the first resource distribution user interface 100 of FIG. 1.

An interface object of the plurality of interface objects 106-116 may be selected by any of various techniques described above relative to FIG. 1. An option to skip the process of preselecting a preferred mode of distribution for the rebate payment resource type is also presented on the second resource distribution user interface 300 as an additional selectable interface object 304, and its selection has the same affect as described above relative to selecting the skip interface object 120. In the example of FIG. 3, the darkened checkbox 118 indicates that the user has selected the prepaid card 110 mode of distribution as the preferred primary mode of distribution for receiving rebate payments from third party payors. As a result, future rebate payment requests received by the resource distribution computing system and directed to the user may be automatically be distributed to the user via a prepaid card 110.

Figure 4:
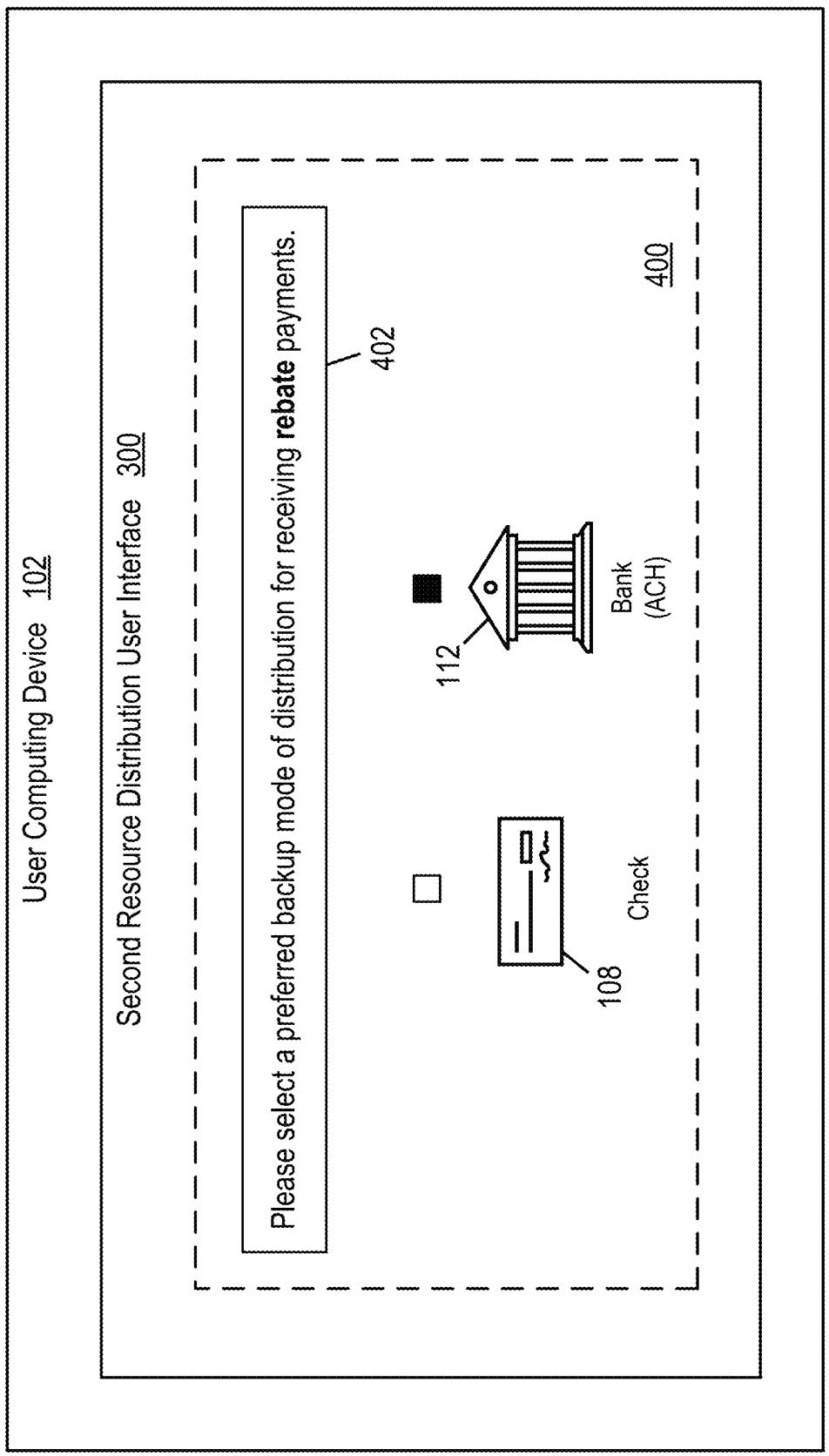
FIG. 4 is a block diagram of another screen of the second user interface via which a user can select a secondary mode of distribution of the second type of resource according to one example.

FIG. 4 is a block diagram depicting one example of a second page 400 of the second resource distribution user interface 300 displayed on the user computing device 102. The second page 400 of the second resource distribution user interface 300 may be displayed after selection of a preferred mode of distribution presented on the initial page or screen of the second resource distribution user interface 300. The second page 400 of the second resource distribution user interface 300 may be displayed in any manner described above relative to the second page 200 of the first resource distribution user interface 100 and may be presented for the same purpose of allowing the user to select an alternative mode of distribution for receiving resource distributions, but in the form of rebate payments in this case. In a similar manner to the initial page or screen of the second resource distribution user interface 300, the second page 400 of the second resource distribution user interface 400 may display a notification 402. The appearance and content of the notification 402 may vary. In this particular example, the notification 402 requests that the user preselect an alternative mode of distribution by which the user will automatically receive future distributions of rebate payments if distribution is for some reason not possible using the already selected preferred prepaid card 110 mode of distribution.

The interface objects and the represented modes of distribution appearing on the second page 400 of the second resource distribution user interface 300 of FIG. 4 may be determined in the same manner described above with respect to the second page 200 of the first resource distribution user interface 100 and its associated interface objects and represented modes of distribution. In this example, the interface objects and associated modes of distribution presented on the second page 400 of the second resource distribution user interface 300 are a subset of the interface objects 106-116 that were not selected as the preferred mode of distribution on the initial page or screen of the second resource distribution user interface 300. Particularly, the paper check 108 interface object and associated mode of distribution and the bank (ACH) transfer 112 interface object and associated mode of distribution are presented on the second page 400 of the second resource distribution user interface 300. Other alternative modes of distribution and other numbers or combinations of alternative modes of distribution may be presented to the user in other examples. In this example, the darkened checkbox 118 indicates that the user has preselected the bank (ACH) transfer 112 mode of distribution as the preferred alternative mode of distribution for receiving rebate payments. Once the preferred alternative mode of distribution has been selected, the mode of distribution preselection process may advance to another resource type or may terminate, as described above.

Figure 5:
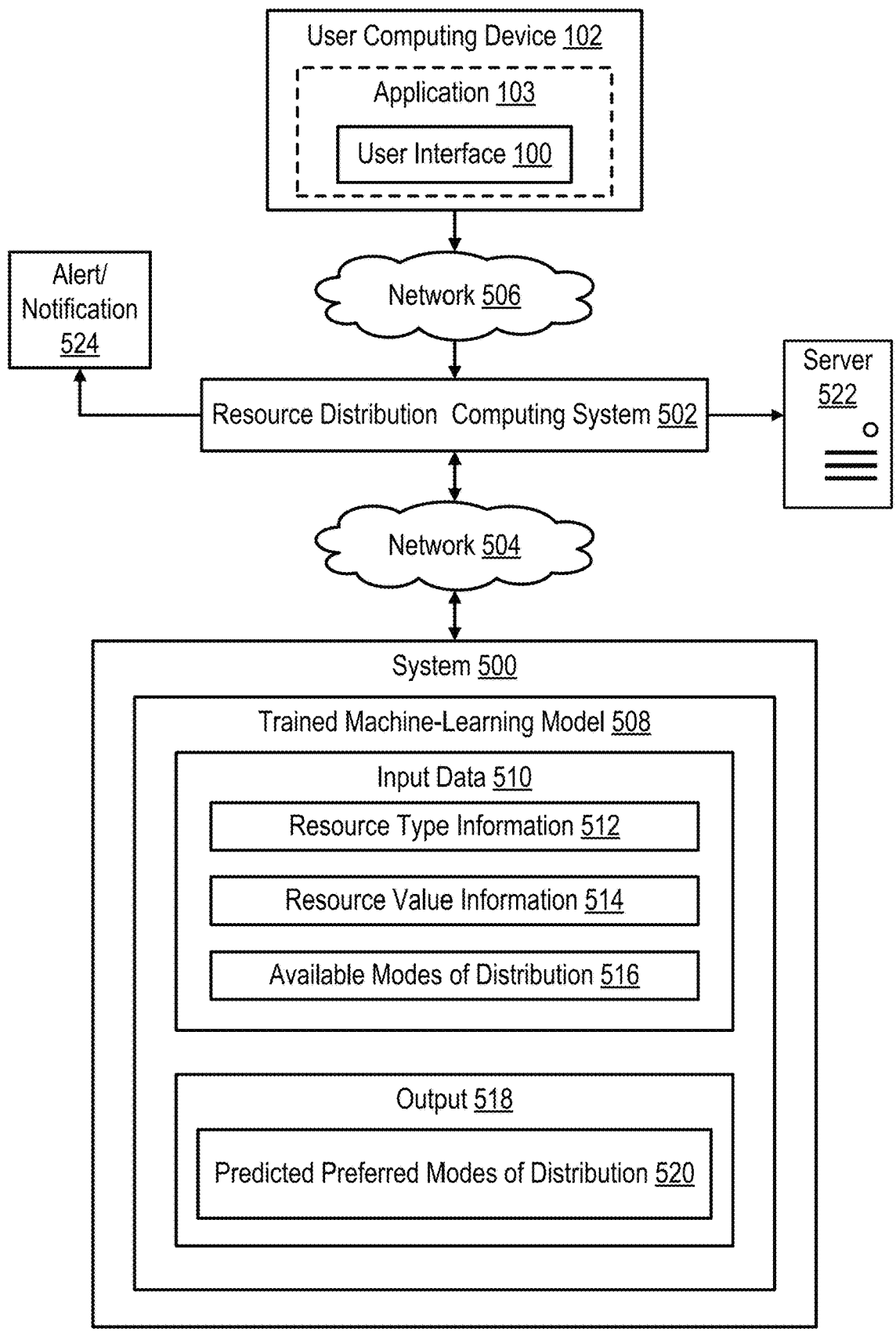
FIG. 5 is a block diagram of a machine-learning-based resource distribution computing system for generating and presenting a user with various selectable modes of distribution for a resource according to one example.

FIG. 5 is a block diagram illustrating one example of a machine-learning-based computing system 500 for facilitating selection of one or more preferred modes of distribution of a resource by a remote resource distribution computing system 502. The computing system 500 can determine what resource modes of distribution should be presented by the representative interface objects 106-116 on the initial page or screen of the first resource distribution user interface 100 displayed on the user computing device 102. In some examples, communications between the user computing device 102 and the remote resource distribution computing system 502 can be conducted using a web browser. In other examples, communications between the user computing device 102 and the remote resource distribution computing system 502 can occur using an application 103 installed on the user computing device 102.

In some examples, the computing system 500 may be operated by an owner or operator of a resource distribution computing system 502, such as the resource distribution computing system described relative to FIGS. 1-4. In other examples, the computing system 500 may be operated on behalf of the owner or operator of the resource distribution computing system 502. In some examples, the computing system 500 may be a computing system of an entity such as a cloud service provider that facilitates distribution of computing resources such as processing and storage resources to users or a financial institution that facilitates distribution of resources such a monetary payments to users. In some examples, the resource distribution computing system 502 may be communicatively coupled to one or more remote servers 522 or other resource distribution computing systems, and may utilize the one or more remote servers 522 or other resource distribution computing systems to distribute resources to users at least with respect to certain modes of distribution (e.g., a stored value card mode of distribution).

The computing system 500 can include various processing and other hardware and software or application components. The computing system 500 may be a standalone computing system such as a desktop or laptop computer, a mobile device, etc. In other examples, the computing system 500 may be a server, or a distributed computing system having multiple servers, virtual machines, etc. In still other examples, the computing system 500 may be a cloud-based computing system that utilizes one or more physical or virtual servers and data storage of a cloud service provider.

The computing system 500 may communicate with the resource distribution computing system 502 over a network 504, and the user computing device 102 may similarly communicate with the resource distribution computing system 502 over a network 506. Either or both of the networks 504, 506 may be a local area network (LAN), a wide-area network (WAN) such as the Internet, an institutional network, cellular or other wireless networks, virtual networks such as an intranet or an extranet, a satellite network, etc.

The computing system 500 can include a trained machine-learning model 508. The trained machine-learning model 508 can be provided with input data 510. In this example, the input data 510 may include resource type information 512 associated with a resource to be distributed to a user. The input data 510 may optionally include resource value 514 information. The input data 510 may also include an identification of all the modes of distribution 516 that can be provided by the resource distribution computing system 502. The trained machine-learning model 508 can be trained to generate an output 518 based on input of some or all of the input data 510 to the trained machine-learning model 508. In some examples, only the resource type information 512 and the available modes of distribution information 516 may be input to the trained machine-learning model 508.

The output 518 of the trained machine-learning model 508 may indicate a prediction 520 of one or more of the available modes of distribution in the resource distribution computing system that will be preferred by the user for distribution of a given resource type (e.g., the refund payment or rebate payment) of FIGS. 1-4. In some examples, the prediction 520 may be based only on the type of the resource and the available modes of distribution in the resource distribution computing system 502. In other examples, the prediction 520 may be based on a combination of one or more of the type of the resource and the value of the resource, in conjunction with the available modes of distribution in the resource distribution computing system 502. Various restrictions may be placed on the output 518 of the trained machine-learning model 508. For example, the output 518 of the trained machine-learning model 508 may be restricted to limit the predicted modes of distribution preferred by the user to some predetermined number of the available modes of distribution.

In some examples, the trained machine-learning model 508 may rank or otherwise assign weight to the predicted modes of distribution that will be preferred by the user. The ranking or weighting may be used by the computing system 500 to determine which of the predicted modes of distribution should be presented to the user in cases where all of the predicted modes of distribution are not presented to the user.

The value of a resource of a given type to be distributed to a user is not known by the resource distribution computing system 502 nor the user at the time the user preselects the preferred mode of distribution relative to the given resource type. Nonetheless, the resource value information 514 can still be a useful part of the input data 510. For example, providing the trained machine-learning model 508 with the resource value information 514 may allow the trained machine-learning model 508 to predict which available modes of distribution in the resource distribution computing system 502 will be preferred by the user for distribution of a given resource type based on the value of the resource (e.g., below a certain dollar amount and above a certain dollar amount). While not expressly shown in the drawing figures, this can then cause the resource distribution computing system 502 to present to the user two different resource distribution user interfaces via which the user can preselect two different preferred primary (or alternative) modes of distribution for the same resource type depending on the resource value. For example, a first such user interface (e.g., a user interface 1A) can present a first plurality of modes of distribution from which the user can preselect a preferred mode of distribution when the value of the resource is below a predetermined threshold. A second such user interface (e.g., a user interface 1B) can present a second plurality of modes of distribution from which the user can preselect a preferred mode of distribution when the value of the resource is above the predetermined threshold.

The first plurality of modes of distribution and the second plurality of modes of distribution may have some commonality or may be entirely different. Likewise, the preferred modes of distribution preselected by the user for each resource value case may the same or different. The preselected modes of distribution will then be used by the resource distribution computing system 502 to make future resource distributions to the user, based not only on the resource type but also on the resource value.

In some examples, once the requested preferred and (in this example) secondary modes of distribution selection(s), have been received, the computing system 500 may store at least the selected preferred primary mode(s) of distribution as a set of user resource distribution rules governing subsequent resource distributions to the user from which the selections were received. When a request is subsequently received from a third party to distribute a resource of a given type and a value to the user, the computing system 500 can retrieve the set of user resource distribution rules and can configure the resource distribution computing system 502 to initiate a distribution of the resource to the user based on at least the resource type indicated in the request and according to the set of user resource distribution rules.

In some examples, configuring the resource distribution computing system 502 to initiate a resource transfer may involve configuring a resource transfer component implemented as, for example, programming in a memory of the resource transfer computing system 502, an application that executes on the resource transfer computing system 502, or a separate hardware component that is communicatively coupled to the resource transfer computing system 502. The resource transfer component can be configured by, for example, sending a resource transfer command message containing configuration/resource transfer initiation instructions to the resource transfer component. The resource transfer component can thus be configured and subsequently caused to initiate a distribution of the resource to the user based on at least the resource type indicated in the third party request and according to the set of user resource distribution rules.

In some examples, the resource distribution computing system 502 can provide a user with an alert/notification 524 when a resource type for which the user has not previously selected a primary or alternative mode of distribution. The user may concurrently be asked or permitted to select a primary and alternative mode of distribution for the given resource type. In another example, the resource distribution computing system 502 can provide a user with the alert/notification 524 when a new mode of distribution is available for one or more resource types. The user may then be asked or permitted to select the new mode of distribution as the primary or alternative mode of distribution for one or more resource types. In some examples, the new mode of distribution may replace a previously selected mode of distribution for a given resource. In another example, the resource distribution computing system 502 can provide a user with the alert/notification when a distribution has been initiated or completed, or if an attempted distribution using a primary or alternative mode of distribution preselected by the user has failed for any reason.

Figure 6:
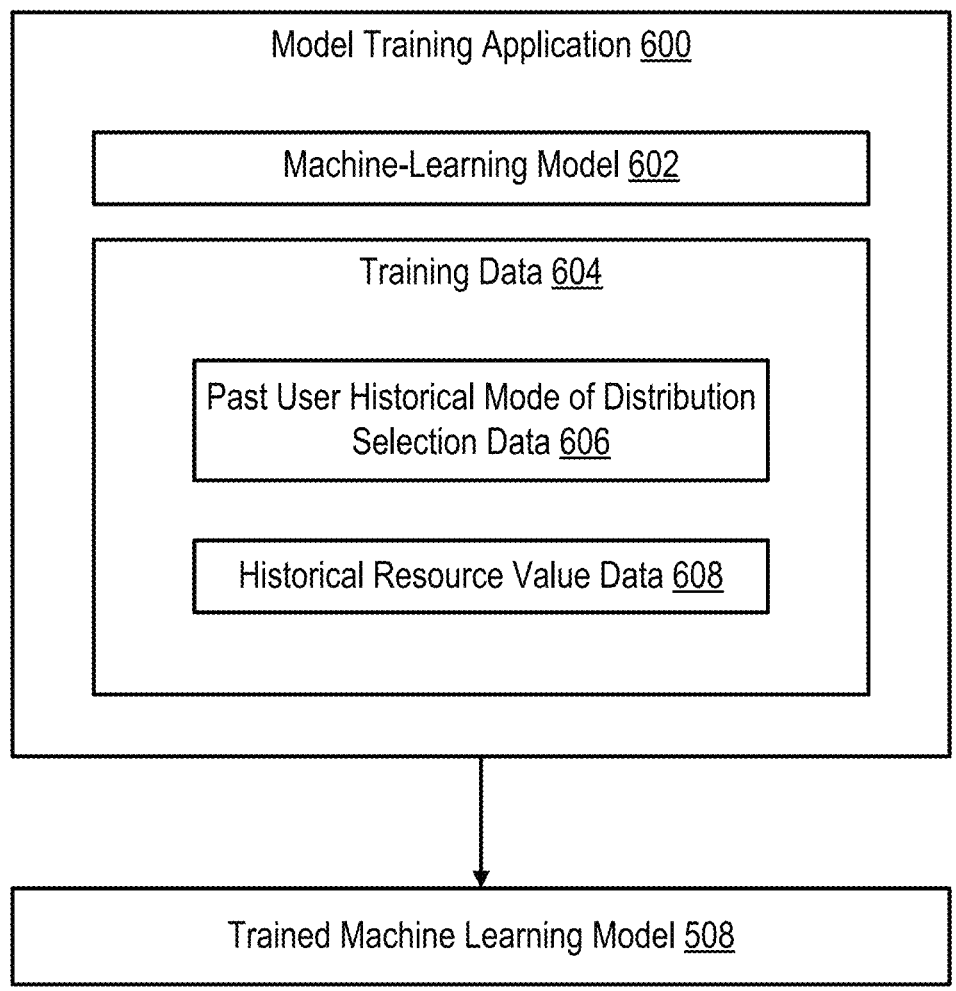
FIG. 6 is a block diagram of an application for training a machine-learning model according to one example.

FIG. 6 is a block diagram of an example of a model-training application 600 that can be implemented to train a machine-learning model 602 to generate a trained machine-learning model, such as the trained machine-learning model 508 of FIG. 5. The model-training application 600 may be a part of the computing system 500, or the model-training application 600 may be separate and remote from the computing system 500. Training the machine-learning model 602 can transform the machine-learning model 602 from an untrained state to a trained state (i.e., to a trained machine-learning model).

Various techniques may be utilized to train the machine-learning model 602. For example, the training data 604 may be provided to the machine-learning model in an iterative manner to enable the machine-learning model 602 to identify trends or relationships in the training data 604. The machine-learning model training may be supervised training, unsupervised training, or a semi-supervised training. Parameter or hyperparameter adjustment may also be utilized to minimize a loss function of the machine-learning model 602.

Training the machine-learning model 602 can include accessing the training data 604, which may be stored, for example, at the computing system 500 or at a database or another storage location that is remote from but accessible by the computing system 500. The training data 604 may include historical selection data 606 associated with a plurality of historical resource mode of distribution selections executed by past users. The historical selection data 606 may include, among other information, an identification of the type of each resource represented in the historical selection data 606. The training data 604 can also include value data 608 that associates a value with each of the resources represented in the historical selection data 606. The values provided in the value data 608 may be monetary values or values of another nature, depending on the resource type. In some examples, one or more of the historical selection data 606 the value data 608 may be weighted prior to being provided to the machine-learning model 602 for training. For example, if it is understood that user mode of distribution selections are most heavily influenced by the type of the resource, then the historical selection data 606 may be assigned more weight than the value data 608 during training of the machine-learning model 602.

While not shown in FIGS. 5-6, it is possible in some examples to also include past user demographic data in the training data 604, and to further use the past user demographic data to train the machine learning model 602. For example, the training data 604 may include demographic data for the past users represented in the historical selection data 606. The past user demographic data may include, for example, user age, user gender, user location (e.g., residence information), and user financial information including but not limited to user income and user bank account information. Other past user information that may be usable to identify trends in user mode of distribution preferences may also be included in the past user demographic data. When provided, the past user demographic data may be used with different combinations of the historical selection data 606 and the value data 608 to train the machine learning model 602. The resulting trained machine learning model 508 may then be able to rely on user demographic information to predict the user preferred modes of distribution 520, whether exclusively or in conjunction with the resource type information 512, the resource value 514 information, and the identification of the available modes of distribution 516.

Various fitting, estimation, or other model-training optimization techniques can be used to ensure that, upon evaluation, the predictive output of the machine-learning model 602 is accurate given the input data (i.e., to minimize the loss function). The resulting trained machine-learning model 608 can then be deployed for application to newly received input data, as described above.

Figure 7:
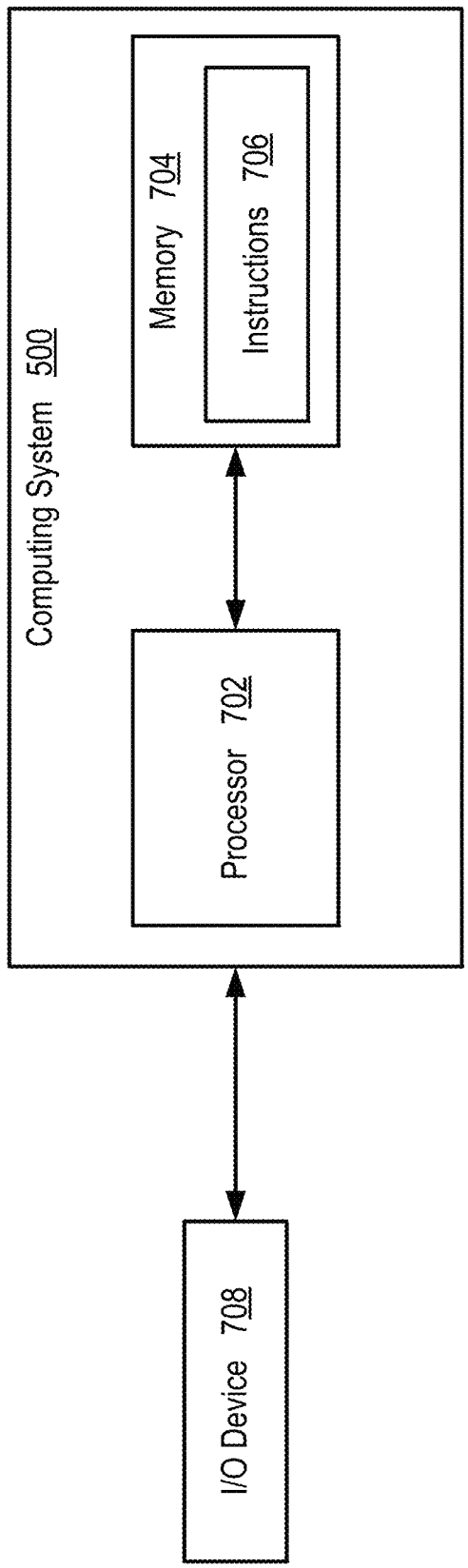
FIG. 7 is a block diagram illustrating various computing components of a resource distribution computing system according to one example.

FIG. 7 is a block diagram illustrating various components of one example of a computing system, such as the computing system 500 of FIG. 5, that is usable to facilitate user indication of one or more preferred modes of distribution by which to receive a resource. As illustrated, the computing system 500 may include a processor 702. The processor 702 can include one processing device or multiple processing devices. Non-limiting examples of the processor 702 include a Field-Programmable Gate Array (FPGA), an application-specific integrated circuit (ASIC), a microprocessor, etc. A memory 704 may be communicatively coupled to the processor 702. The memory 704 can include instructions that are executable by the processor 702 to cause the processor 702 to perform operations. In some examples, the instructions 706 can include processor-specific instructions generated by a compiler or an interpreter from code written in a suitable computer-programming language, such as, but not limited to, C, C++, C#, Python, etc.

The memory 704 can include one memory or multiple memories. The memory 704 can be non-volatile and may include any type of memory that retains stored information when powered off. Non-limiting examples of the memory 704 include electrically erasable and programmable read-only memory (EEPROM), flash memory, or any other type of non-volatile memory. At least some of the memory 704 can be a non-transitory computer-readable medium from which the processor 702 can read the instructions 706. A computer-readable medium can include electronic, optical, magnetic, or other storage devices capable of providing the processor 702 with computer-readable instructions or other program code. Non-limiting examples of a computer-readable medium include magnetic disk(s), memory chip(s), ROM, random-access memory (RAM), an ASIC, a configured processor, optical storage, or any other medium from which the processor 702 can read the instructions 706. In some examples, the memory 704 may include the trained machine-learning model 508.

Figure 8:
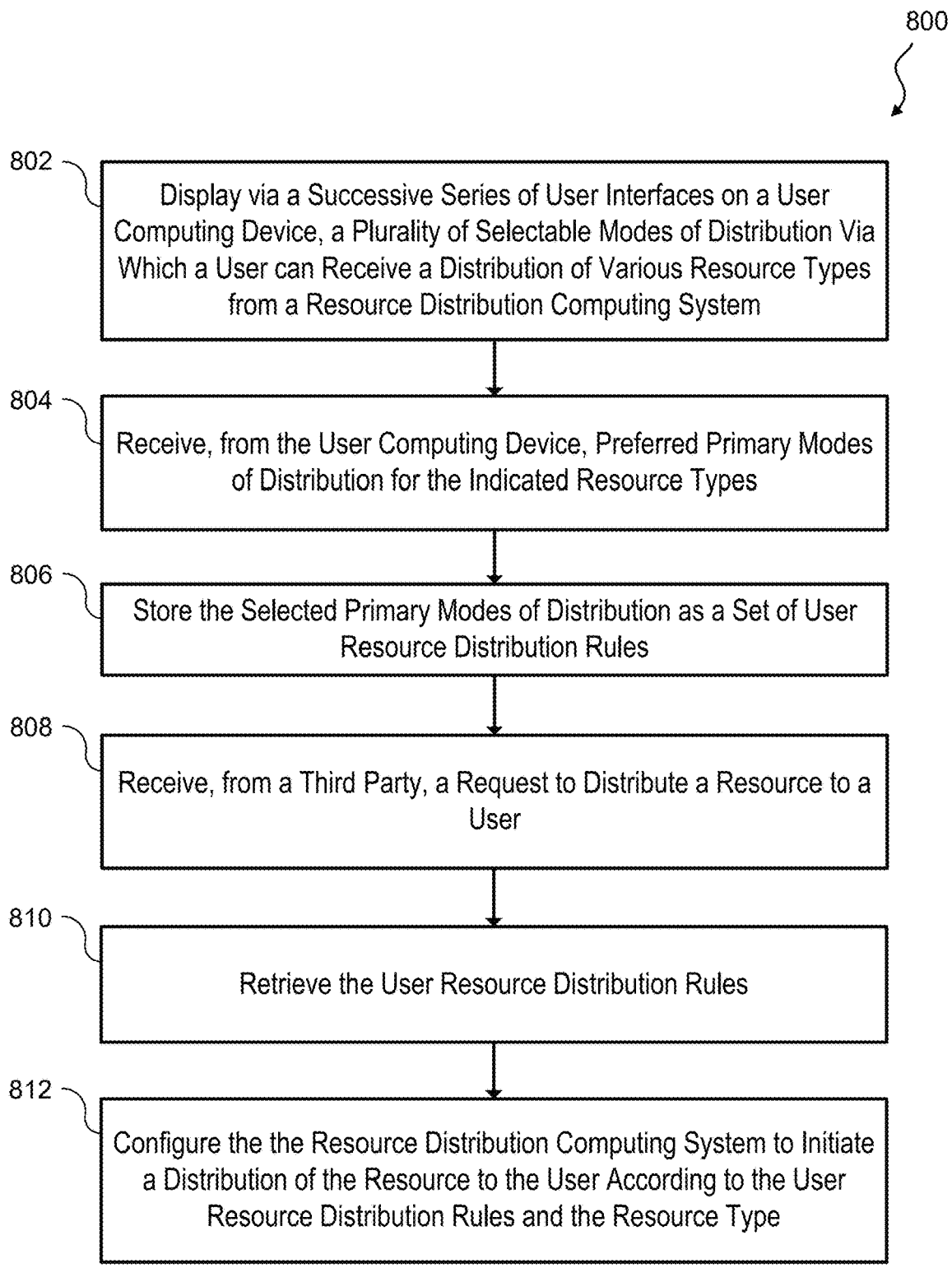
FIG. 8 is a flowchart of a computer-implemented method for facilitating resource distribution utilizing preselected mode of distribution preferences according to one example.

FIG. 8 is a flowchart 800 of one example of a computer-implemented method for facilitating user preselection of preferred modes of distribution for different resource types. A user computing device may initially establish a secure connection with a resource distribution computing system that will be used to distribute the resource to the user. The resource distribution computing system may then allow the user computing device to register with the resource distribution computing system or, if the user computing device is already registered, may authenticate a user account associated with the user computing device through login credentials or otherwise. In some examples, the resource distribution computing system may be a financial institution computing system and the user may be a customer of the financial institution. In some examples, the resource distribution computing system may be a cloud-based computing system hosted by a cloud service provider. The resource distribution computing system may also include a host server, which can be a physical or virtual server.

As indicated in block 802 of the flowchart 800, a user interface is displayed on a user computing device. The user interface may be a customizable resource distribution user interface. The user interface may be a first resource distribution user interface of a plurality of related and cooperating resource distribution user interfaces. The user interface may be one user interface of a series of user interfaces that are presented to the user. Each user interface can have displayed thereon a plurality of different modes of distribution by which an indicated resource type of various different resource types are distributable to a user by a resource distribution computing system.

In block 804 of the flowchart 800, one or more of the plurality of modes of distribution is received from the user computing device as preferred primary modes of distribution for the different resource types. The preferred primary modes of distribution may be received, for example, via a selection thereof at each user interface. In this manner, the user can select a preferred primary mode of distribution for some or all the resource types that are distributable by the resource distribution computing system. In some examples, each mode of distribution can be represented by a unique interface object, such that a given user interface of the series of user interfaces can present a plurality of interface objects. The modes of distribution represented by the interface objects may be selected for presentation on the user computing device based on various factors. In some examples, selection of the modes of distribution to be represented on the user interfaces by the interface objects may be performed by a trained machine learning model that is applied to various input data. The trained machine-learning model may have been previously trained on training data comprising one or more of historical selection data associated with a plurality of resource historical mode of distribution selections executed by past users, and value data that associates a value with each of the resources represented in the historical selection data.

At block 806 of the flowchart 800, the selected preferred primary modes of distribution are stored by the resource distribution computing system as a set of user resource distribution rules governing future resource distributions to the user.

As indicated in block 808 of the flowchart 800, a request from a third party to distribute a resource to a user may be received at the resource distribution computing system. The request can indicate at least an identification of the user and a type of the resource to be distributed to the user. The request may also indicate a value of the resource. In some examples, the request may be a request to distribute a monetary resource of an indicated value to the user. For example, the monetary resource may be a rebate, a refund, or a reward owed to the user by the third party.

As indicated in block 810 of the flowchart 800, the resource distribution rules can then be retrieved and used, at least in part, to direct the requested resource distribution to the user.

At block 812 of the flowchart 800, the resource distribution computing system can be configured to initiate a distribution of the resource to the user according to the user resource distribution rules and the resource type indicated in the request. This causes the requested resource to be automatically distributed to the user via the preferred method preselected by the user for the type of resource being distributed.

The foregoing description of certain examples, including illustrated examples, has been presented only for purposes of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A system comprising:
a machine-learning-based computing system; and
a resource distribution computing system communicatively coupled to the machine-learning-based computing system, the resource distribution computing system including a processor and a memory communicatively coupled to the processor, the memory including instructions that are executable by the processor to cause the resource distribution computing system to perform operations comprising:
  establishing a secure connection with a user computing device;
  authenticating a user account associated with the user computing device;
  obtaining, from a predictive output of a trained machine-learning model of the machine-learning-based computing system, a recommended plurality of modes of distribution for different resource types to present on the user computing device, wherein the recommended plurality of modes of distribution are based at least in part on information about the user and comprise at least some of various modes of distribution by which the different resource types are distributable to the user by the resource distribution computing system;
  causing an application installed on the user computing device to display the recommended plurality of modes of distribution for the different resource types via a successive series of user interfaces to prompt the user, at a given user interface, to select a preferred primary mode of distribution or an alternative mode of distribution for the resource type presented on the given user interface;
  receiving, from the user computing device, the preferred primary modes of distribution and the alternative modes of distribution selected at the series of user interfaces for each of the different resource types, and storing the preferred primary modes of distribution and the alternative modes of distribution as a set of user resource distribution rules governing subsequent resource distributions to the user;
  subsequently receiving a request from a third party to distribute a resource to the user, the request including information indicating a type and a value of the resource;
  retrieving, the set of user resource distribution rules;
  identifying the preferred primary mode of distribution and the alternative mode of distribution selected by the user according to the user resource distribution rules for the resource type associated with the request to distribute the resource to the user;
  comparing, at a time for distributing the resource to the user, a speed at which the resource is distributable to the user via the selected preferred primary mode of distribution to a speed at which the resource is distributable to the user via the selected alternative mode of distribution;

determining that the speed at which the resource is distributable to the user via the selected alternative mode of distribution is faster than the speed at which the resource is distributable to the user via the selected preferred primary mode of distribution;

transmitting, to a resource transfer component, a resource transfer command message containing resource transfer configuration instructions that reconfigure the resource transfer component to distribute the resource to the user via the selected alternative mode of distribution instead of the selected preferred primary mode of distribution; and initiating, by the resource transfer component, a distribution of the resource to the user via the selected alternative mode of distribution.

2. The system of claim 1, wherein:

each of the plurality of modes of distribution is represented on the user computing device by a selectable interface object; and the plurality of modes of distribution represented on the user interfaces include digital modes of distribution and physical modes of distribution.

3. The system of claim 1, wherein the plurality of modes of distribution are selectable from a larger group of possible modes of distribution based, at least in part, on a ranking or weighting assigned thereto by the trained machine-learning model.

4. The system of claim 1, wherein the operations further comprise:

transmitting to the user computing device, an alert or notification each time a new mode of distribution becomes available for one or more of the different resource types;

receiving, from the user computing device, a selection of a new mode of distribution as a preferred primary mode of distribution or an alternative mode of distribution for a resource type of the one or more different resource types; and storing, in the user resource distribution rules, the new mode of distribution as the preferred primary mode of distribution or the alternative mode of distribution for the given resource type.

5. The system of claim 1, wherein obtaining the recommended plurality of modes of distribution for the different resource types from the output of the trained machine-learning model further comprises:

providing an input to the trained machine-learning model, wherein the input comprises an identification of the plurality of modes of distribution that are available to the resource distribution computing system, the resource type, the value of the resource, and user demographic information, and wherein the output of the trained machine-learning model indicates a prediction of a plurality of available modes of distribution most likely to be selected by the user; and selecting some or all of the plurality of the available modes of distribution output by the trained machine-learning model for presentation on the user computing device.

6. The system of claim 1, wherein the resource transfer component is a remote server that is communicatively coupled to the resource distribution computing system.

7. The system of claim 1, wherein:

the operations further comprise receiving an initial registration request from the user computing device; and obtaining the recommended plurality of modes of distribution for the different resource types from the machine-learning-based computing system and the causing the application installed on the user computing device to display the recommended plurality of modes of distribution for the different resource types are both in response to the initial registration request.

8. A computer-implemented method comprising:

communicatively coupling a resource distribution computing system between and to a user computing device and a machine-learning-based computing system;

establishing a secure connection between at least the resource distribution computing system and the user computing device;

authenticating a user account associated with the user computing device;

obtaining, by the resource distribution computing system, from a predictive output of a trained machine-learning model of the machine-learning-based computing system, a recommended plurality of modes of distribution for different resource types to present on the user computing device, wherein the recommended plurality of modes of distribution are based at least in part on information about the user and comprise at least some of various modes of distribution by which the different resource types are distributable to the user by the resource distribution computing system, causing, by the resource distribution computing system, an application installed on the user computing device to display the recommended plurality of modes of distribution for the different resource types via a successive series of user interfaces, and prompt the user, at a given user interface, to select a preferred primary mode of distribution or an alternative mode of distribution for the resource type presented on the given user interface;

receiving, by the resource distribution computing system, from the user computing device, the preferred primary modes of distribution and the alternative modes of distribution selected at the series of user interfaces for each of the different resource types;

storing, by the resource distribution computing system, the preferred primary modes of distribution and the alternative modes of distribution as a set of user resource distribution rules governing subsequent resource distributions to the user;

subsequently receiving, by the resource distribution computing system, a request from a third party to distribute a resource to the user, the request including information indicating a type and a value of the resource;

in response, retrieving by the resource distribution computing system, the set of user resource distribution rules;

identifying, by the resource distribution computing system, the preferred primary mode of distribution and the alternative mode of distribution selected by the user according to the user resource distribution rules for the resource type associated with the request to distribute the resource to the user;

comparing, by the resource distribution computing system, at a time for distributing the resource to the user, a speed at which the resource is distributable to the user via the selected preferred primary mode of distribution to a speed at which the resource is distributable to the user via the selected alternative mode of distribution;

determining, by the resource distribution computing system, that the speed at which the resource is distributable to the user via the selected alternative mode of distribution is faster than the speed at which the resource is distributable to the user via the selected preferred primary mode of distribution;

transmitting, by the resource distribution computing system, to a resource transfer component, a resource transfer command message containing resource transfer configuration instructions that reconfigure the resource transfer component to distribute the resource to the user via the selected alternative mode of distribution instead of the selected preferred primary mode of distribution; and initiating, by the resource transfer component, a distribution of the resource to the user via the selected alternative mode of distribution.

9. The computer-implemented method of claim 8, wherein each of the plurality of modes of distribution is displayed on the user computing device as a selectable interface object.

10. The computer-implemented method of claim 8, wherein the plurality of modes of distribution displayed on the user computing device are selected from a larger group of possible modes of distribution based, at least in part, on a ranking or weighting assigned thereto by the trained machine-learning model.

11. The computer-implemented method of claim 8, further comprising:

transmitting to the user computing device, by the resource distribution computing system, an alert or notification each time a new mode of distribution becomes available for one or more of the different resource types;

receiving, by the resource distribution computing system, from the user computing device, a selection of a new mode of distribution as a preferred primary mode of distribution or an alternative mode of distribution for a resource type of the one or more different resource types; and storing, in the user resource distribution rules, the new mode of distribution as the preferred primary mode of distribution or the alternative mode of distribution for the given resource type.

12. The computer-implemented method of claim 8, wherein the alternative mode of distribution for a given resource type is used to distribute an associated resource to the user when distribution of the resource to the user by the preferred primary mode of distribution of the resource is not possible.

13. The computer-implemented method of claim 8, wherein obtaining the recommended plurality of modes of distribution for the different resource types from the output of the trained machine-learning model further comprises:

providing an input to the trained machine-learning model, wherein the input comprises an identification of the plurality of modes of distribution that are available to the resource distribution computing system, the resource type, and the value of the resource, and wherein the output of the trained machine-learning model indicates a prediction of a plurality of available modes of distribution most likely to be selected; and selecting some or all of the plurality of the available modes of distribution output by the trained machine-learning model for presentation on the user computing device.

14. The computer-implemented method of claim 13, wherein:

the input to the trained machine-learning model further comprises user demographic information; and the request from the third party to distribute the resource to the user includes demographic information for the user.

15. A non-transitory computer-readable medium comprising instructions that are executable by a processor of a resource distribution computing system for causing the resource distribution computing system to perform operations comprising:

establishing a secure connection with a user computing device;

authenticating a user account associated with the user computing device;

obtaining, from a predictive output of a trained machine-learning model of a machine-learning-based computing system communicatively coupled to the resource distribution computing system, a recommended plurality of modes of distribution for different resource types to present on the user computing device, wherein the recommended plurality of modes of distribution-comprising are based at least in part on information about the user and comprise at least some of various modes of distribution by which the different resource types are distributable to the user by the resource distribution computing system;

causing an application installed on the user computing device to display the recommended plurality of modes of distribution for the different resource types via a successive series of user interfaces, and to prompt the user, at a given user interface, to select a preferred primary mode of distribution or an alternative mode of distribution for the resource type presented on the given user interface;

receiving, from the user computing device, the preferred primary modes of distribution and the alternative modes of distribution selected at the series of user interfaces for each of the different resource types, and causing the preferred primary modes of distribution and the alternative modes of distribution to be stored as a set of user resource distribution rules governing subsequent resource distributions to the user;

subsequently receiving a request from a third party to distribute a resource to the user, the request including information indicating a type and a value of the resource;

retrieving, the set of user resource distribution rules;

identifying the preferred primary mode of distribution and the alternative mode of distribution selected by the user according to the user resource distribution rules for the resource type associated with the request to distribute the resource to the user;

comparing, at a time for distributing the resource to the user, a speed at which the resource is distributable to the user via the selected preferred primary mode of distribution to a speed at which the resource is distributable to the user via the selected alternative mode of distribution;

determining that the speed at which the resource is distributable to the user via the selected alternative mode of distribution is faster than the speed at which the resource is distributable to the user via the selected preferred primary mode of distribution;

transmitting, to a resource transfer component, a resource transfer command message containing resource transfer configuration instructions that reconfigure the resource transfer component to distribute the resource to the user via the selected alternative mode of distribution instead of the selected preferred primary mode of distribution; and initiating, by the resource transfer component, a distribution of the resource to the user via the selected alternative mode of distribution.

16. The non-transitory computer-readable medium of claim 15, wherein each of the plurality of modes of distribution is represented on the user computing device by a selectable interface object.

17. The non-transitory computer-readable medium of claim 16, wherein the plurality of modes of distribution are selectable from a larger group of possible modes of distribution based, at least in part, on a ranking or weighting assigned thereto by the trained machine-learning model.

18. The non-transitory computer-readable medium of claim 15, wherein the operations of the resource distribution computing system further comprise:

transmitting to the user computing device, an alert or notification each time a new mode of distribution becomes available for one or more of the different resource types;

receiving, from the user computing device, a selection of a new mode of distribution as a preferred primary mode of distribution or an alternative mode of distribution for a resource type of the one or more different resource types; and storing, in the user resource distribution rules, the new mode of distribution as the preferred primary mode of distribution or the alternative mode of distribution for the given resource type.

19. The non-transitory computer-readable medium of claim 15, wherein obtaining the recommended plurality of modes of distribution for the different resource types from the output of the trained machine-learning model further comprises:

providing an input to the trained machine-learning model, wherein the input comprises an identification of the plurality of modes of distribution that are available to the resource distribution computing system, the resource type, and the value of the resource, and wherein the output of the trained machine-learning model indicates a prediction of a plurality of available modes of distribution most likely to be selected by the user; and selecting some or all of the plurality of the available modes of distribution output by the trained machine-learning model for presentation on the user computing device.

20. The non-transitory computer-readable medium of claim 19, wherein:

the input to the trained machine-learning model further comprises user demographic information; and the request from the third party to distribute the resource to the user includes demographic information for the user.

\* \* \* \* \*